United States Patent
Venable

(10) Patent No.: US 7,918,626 B2
(45) Date of Patent: Apr. 5, 2011

(54) SYSTEMS AND METHODS FOR PIPE REPLACEMENT

(76) Inventor: Oran W. Venable, Lockhart, TX (US)

( * ) Notice: Subject to any disclaimer, the term of this patent is extended or adjusted under 35 U.S.C. 154(b) by 86 days.

(21) Appl. No.: 12/269,466

(22) Filed: Nov. 12, 2008

(65) Prior Publication Data

US 2009/0123234 A1    May 14, 2009

Related U.S. Application Data

(60) Provisional application No. 60/987,668, filed on Nov. 13, 2007.

(51) Int. Cl.
*F16L 55/18*  (2006.01)
(52) U.S. Cl. .................. 405/184.3; 405/184; 138/97
(58) Field of Classification Search .................. 405/156, 405/184, 184.1, 184.2, 184.3, 184.4; 138/97
See application file for complete search history.

(56) References Cited

U.S. PATENT DOCUMENTS

| | | | | |
|---|---|---|---|---|
| 4,505,302 | A * | 3/1985 | Streatfield et al. | 405/184 |
| 4,674,914 | A * | 6/1987 | Wayman et al. | 405/184.3 |
| 4,693,404 | A * | 9/1987 | Wayman et al. | 405/156 |
| 4,732,222 | A * | 3/1988 | Schmidt | 405/156 |
| 5,013,188 | A * | 5/1991 | Campbell et al. | 405/184 |
| 5,076,731 | A * | 12/1991 | Luksch | 405/184.3 |
| 5,078,546 | A * | 1/1992 | Fisk et al. | 405/184.3 |
| 5,098,225 | A * | 3/1992 | Rockower et al. | 405/156 |
| 5,127,481 | A * | 7/1992 | Hesse | 405/156 |
| 5,207,533 | A * | 5/1993 | Federspiel et al. | 405/156 |
| 5,302,053 | A * | 4/1994 | Moriarty | 405/184.3 |
| 5,306,101 | A * | 4/1994 | Rockower et al. | 405/184.3 |
| 5,507,597 | A * | 4/1996 | McConnell | 405/156 |
| 5,709,503 | A * | 1/1998 | Manlow | 405/184.3 |
| 5,785,458 | A * | 7/1998 | Handford | 405/184.3 |
| 5,876,152 | A * | 3/1999 | Hesse | 405/184.3 |
| 6,357,967 | B1 * | 3/2002 | Putnam | 405/184.3 |
| 6,761,507 | B2 * | 7/2004 | Wentworth et al. | 405/184.3 |
| 7,624,817 | B2 * | 12/2009 | Putnam | 405/184.3 |
| 2004/0218982 | A1 * | 11/2004 | Wentworth et al. | 405/184.3 |
| 2004/0223812 | A1 * | 11/2004 | Wentworth et al. | 405/184.3 |
| 2004/0228691 | A1 * | 11/2004 | Tjader | 405/184.3 |
| 2007/0036613 | A1 * | 2/2007 | Tjader | 405/184.3 |
| 2008/0296066 | A1 * | 12/2008 | Putnam | 175/53 |

* cited by examiner

*Primary Examiner* — Frederick L Lagman
(74) *Attorney, Agent, or Firm* — Law Offices of Mark L. Berrier

(57) ABSTRACT

Systems and methods for concurrently destroying old pipes and installing new pipes in their place. An exemplary embodiment is a pipe bursting and replacement tool that includes a body and first and second connectors. The body has a shape that generally tapers from a smaller diameter at the front end to a larger diameter at the rear end. The taper need not be smoothly increasing, but may alternatively be stepped. The first connector couples the body to a pulling rod to and allows the body to be misaligned with the rod to relieve stress on the connection between the two. The second connector couples the replacement pipe to the body so that the replacement pipe can be pulled behind the body into the space previously occupied by an old pipe that is burst by the tool.

11 Claims, 3 Drawing Sheets

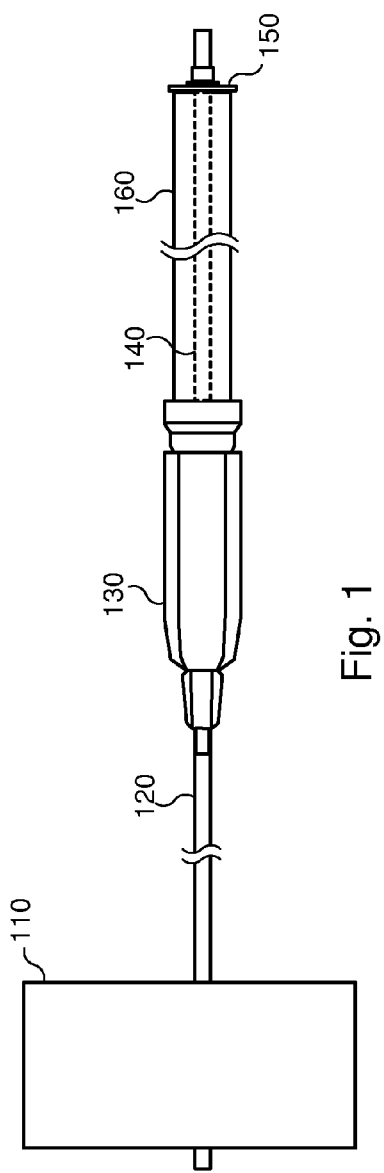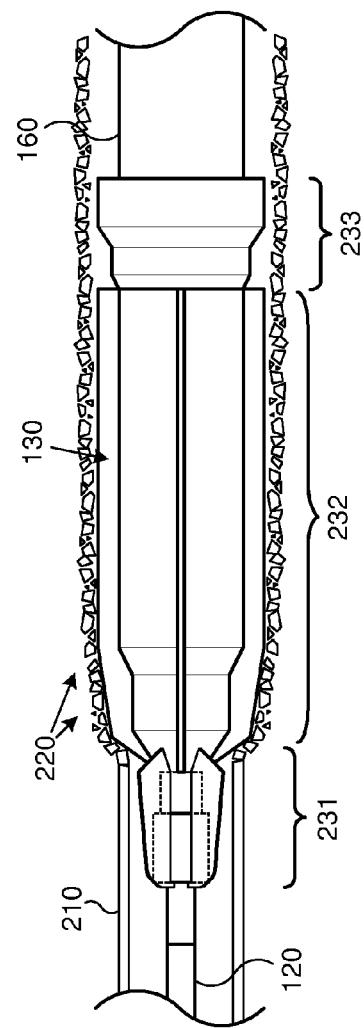

SYSTEMS AND METHODS FOR PIPE REPLACEMENT

CROSS-REFERENCE TO RELATED APPLICATIONS

This application claims the benefit of U.S. Provisional Patent Application 60/987,668, filed Nov. 13, 2007, which is incorporated by reference as if set forth herein in its entirety.

BRIEF DESCRIPTION OF THE DRAWINGS

Other objects and advantages of the invention may become apparent upon reading the following detailed description and upon reference to the accompanying drawings.

FIG. 1 is a diagram illustrating a diagram illustrating an exemplary system for pipe-bursting in accordance with one embodiment of the invention.

FIG. 2 is a more detailed view of the pipe-bursting tool of FIG. 1.

Figure 3:
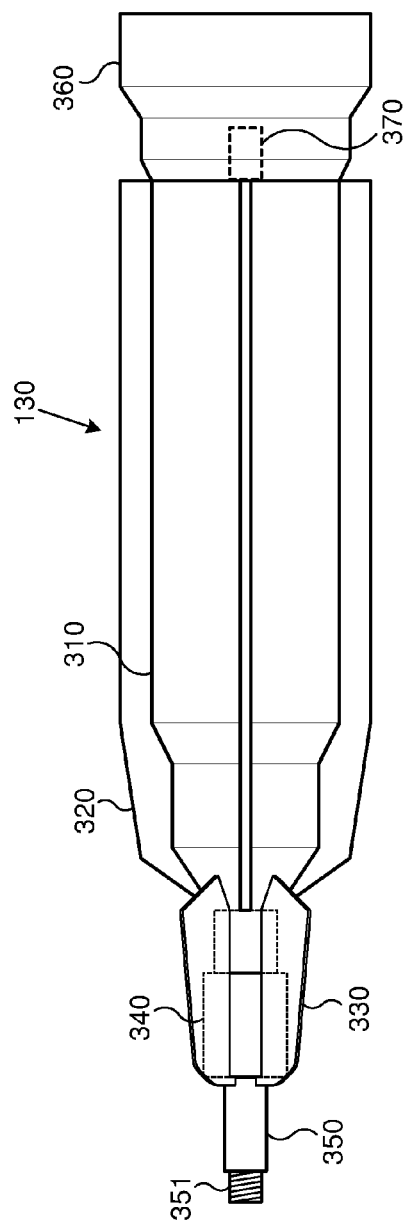
FIG. 3 is a side view of the pipe-bursting tool of FIG. 1.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION OF EXEMPLARY EMBODIMENTS

One or more embodiments of the invention are described below. It should be noted that these and any other embodiments described below are exemplary and are intended to be illustrative of the invention rather than limiting.

The invention relates generally to plumbing and more particularly to systems and methods for concurrently destroying old pipes and installing new pipes in their place.

Pipes are commonly used to carry fresh water into buildings and to remove wastewater from the buildings. Typically, the pipes are installed underground and run from a point external to the building, under (or through) the foundation of the building and then into the building itself. Over time, the pipes may weaken and fail, causing them to leak, or even burst. The pipes may therefore need to be replaced from time to time.

Old methods of replacing pipes were very destructive. Typically, and underground pipe would have to be dug up to expose the pipe, removed, then replaced with a new pipe and covered up again. This process could require large trenching machines, and was expensive and time-consuming. If the pipe being replaced ran underneath a foundation, it would be necessary to tunnel under the foundation to gain access to the pipe, thereby making the process even more destructive, expensive and time-consuming.

Newer technologies were therefore developed to minimize the damage caused by digging up old pipes, and to minimize the time and expense associated with the process. One of the technologies that was developed was a pipe-bursting technology. This involved the use of a pipe-bursting tool such as a cone which had a larger diameter than the inner diameter of the pipe, and was pulled by a chain through the pipe in order to burst the pipe. In some cases, it was attempted to insert a new pipe after the old pipe was burst, but this typically was difficult to do because the pieces of the old pipe would remain in place, making it difficult to insert the new pipe in place at the old pipe. In other cases, it was attempted to push the bursting tool (e.g., a bursting cone) through the old pipe using the new pipe. This reduced the problem of having pieces of the old pipe get in the way, but placed stresses on the new pipe which increased the possibility that the new pipe would be damaged.

It is therefore desirable to provide improved systems and methods for replacing old pipes using pipe-bursting technologies.

This disclosure is directed to systems and methods for concurrently destroying old pipes and installing new pipes in their place. Embodiments of the invention may solve one or more of the problems discussed above.

An exemplary embodiment is a pipe bursting and replacement tool that includes a body and first and second connectors. The body has a shape that generally tapers from a smaller diameter at the front end to a larger diameter at the rear end. The taper need not be smoothly increasing, but may alternatively be stepped. The first connector couples the body to a pulling rod to and allows the body to be misaligned with the rod to relieve stress on the connection between the two. The second connector couples the replacement pipe to the body so that the replacement pipe can be pulled behind the body into the space previously occupied by an old pipe that is burst by the tool.

The body may have fins or other structures that are positioned on its sides to facilitate bursting of the old pipes. The body may include a bell-shaped portion at its rear end to force remnants of the burst pipe outward from the pipe-bursting body and to accommodate the front end of the replacement pipe to make it easier to pull the new pipe through the space previously occupied by the old pipe. The first connector may be disposed at the front end of the body for attachment to the pulling rod. The first connector may be threaded and may be configured to swivel with respect to the body. The tool may include a second threaded rod and a coupling at the rear end of the rod to pull the replacement pipe behind the body.

Another embodiment may include not only a pipe bursting tool as described above, but also a rod puller configured to pull the pulling rod and the tool through the old pipe to burst the pipe. Yet another embodiment may comprise a method, including providing a pipe-bursting body as described above, pulling the pipe-bursting body with a pulling rod while allowing the body to misalign with the pulling rod through an old pipe while allowing the body to misalign with the pulling rod, and pulling the replacement pipe behind the pipe-bursting body into the space previously occupied by the old pipe.

The exemplary embodiments of the invention will now be described in more detail. Referring to FIG. 1, a diagram illustrating an exemplary system for pipe-bursting in accordance with one embodiment of the invention is shown. The system includes a hydraulic puller 110, a first pulling rod 120, a pipe-bursting tool 130, a second pulling rod 140 and a collar 150.

Pulling rod 120 is connected to the front end of tool 130. In one embodiment, the rod is connected to the tool by means of complementary threads which allow the rod to be screwed onto the front of the tool. Hydraulic puller 110 is configured to grasp rod 120 and to pull the rod, which in turn pulls tool 130. This allows tool 130 to be pulled through an old pipe, bursting the pipe and allowing insertion of a new pipe.

The second pulling rod 140 is connected to the back end of pipe-bursting tool 130. The connection between rod 140 and tool 130 is also configured in this embodiment to make use of complementary threads so that the rod can be screwed onto the tool. Rod 140 extends backward from the tool for a distance which is greater than the length of pipe (160) which will be pulled behind the tool. After pipe 160 is placed over rod 140, collar 150 is placed on rod 140 and secured to the rod. When tool 130 is pulled through an old pipe to burst the pipe, collar 150 effectively pushes the new pipe through the remaining hole behind tool 130.

Referring to FIG. 2, a more detailed view of tool 130 in use is shown. As shown in this figure, tool 130 is being pulled by rod 120 through an old pipe 210. It should be noted that the use of a pulling rod is generally safer than the use of a chain to pull the pipe-bursting tool through the old pipe, because if the chain breaks it typically snaps back (much like a giant rubber band,) potentially injuring any workers who are nearby and damaging the pulling equipment. If the rod breaks, it presents no such danger. As tool 130 is pulled through pipe 210, the pipe is burst, leaving broken pieces of the pipe (220) around the tool. The broken pieces 220 of the pipe are pushed to the outer edges of the hole so that new pipe 160 can be more easily inserted into the hole.

It can be seen in FIG. 2 that tool 130 has three relatively distinct portions: a front or nose portion 231; a center portion 232; and a rear portion 233. Front portion 231 includes a threaded component configured to be coupled to pulling rod 120. Front portion 231 includes a set of fins which help guide tool 130 through the old pipe, and a swiveling mechanism which allows the tool to deviate slightly from a position which is coaxial with pulling rod 120, thereby reducing stress on the connection to the pulling rod. Center portion 232 is somewhat elongated, and has a set of fins which concentrate the bursting force which is applied to the old pipe. Rear portion 233 has a diameter which increases from front to back in order to help push broken pipe pieces 220 out of the way and to compact them into the surrounding soil so that new pipe 160 can more easily be inserted into the hole.

Figure 4:
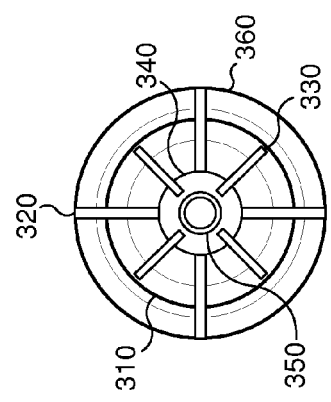
FIG. 4 is a top view of the pipe-bursting tool of FIG. 1.

Referring to FIGS. 3 and 4, detailed views of pipe-bursting tool 130 are shown. FIG. 3 is a side view of pipe-bursting tool 130, while FIG. 4 is a top view of the tool.

Tool 130 includes a main body 310 which is generally bullet-shaped. That is, the body is elongated, with a diameter that tapers down at the front (i.e., at the left side of FIG. 3.) The elongated main body helps to keep the tool in alignment with the pipe being burst. A series of fins (e.g., 320) are attached to main body 310 around its circumference. In this embodiment, there are four fins that are equally spaced around the circumference of the tool. Each fin 320 extends along the length of main body 310. The fins extend radially outward from the main body by a relatively constant amount over most of their length, but angle inward toward the axis of the tool at the front (to the left the FIG. 3.) As shown in FIG. 2, the fins contact the inner surface of the old pipe and apply pressure to the pipe as the tool is pulled through the pipe, thereby causing the pipe to break or burst. Because the contact surface of the fins with the old pipe is smaller than if a simple cone is used to burst the pipe, the bursting pressure applied by the tool is concentrated at the fins to facilitate breaking the pipe.

Attached to the front end of main body 310 is a nose portion of the tool. In this embodiment, the nose portion serves two purposes: first, it provides a means to connect the pipe-bursting tool to the pulling rod; and second, it allows the tool to swivel somewhat with respect to the pulling rod. The nose portion of the tool is connected to main body 310 by a smaller set of fins (e.g., 330.) These fins are rigidly connected (e.g., welded) to the main body. The smaller fins are also rigidly connected to a cylinder 340 which forms a part of the swiveling mechanism. Finally, the nose portion includes a connecting rod 350 which has a threaded portion 351 configured to be screwed into the pulling rod. Connecting rod 350 is positioned within cylinder 340 and is retained by cylinder 340, as will be explained in more detail below.

Attached to the rear end of main body 310 is a bell-shaped rear portion 360. In this embodiment, rear portion 360 tapers (in stages) from a smaller diameter at the attachment to main body 310 to a larger diameter at the rear end of the tool. The tapered design of rear portion 360 serves to push broken pieces of the old pipe radially outward from the axis of the tool. This not only serves to push broken pieces off the old pipe out of the way of the new pipe which is being inserted behind the tool, but also serves to compact the soil around the pipe to facilitate insertion of the new pipe. The diameter of rear portion 360 is large enough to accommodate the diameter of the new pipe. In other words, the front end of the new pipe can fit within the larger end of rear portion 360 so that the end of the pipe does not run into the soil or broken pieces of the old pipe. Rear portion 360 also includes a rear connecting rod 370 which allows a second pulling rod to be connected to the tool. As shown in FIG. 1, this second pulling rod extends backward from the tool to provide a means for pulling the new pipe through the hole behind the tool as it bursts the old pipe. In this embodiment, rear connecting rod 370 is threaded, similar to connecting rod 350, so that it can be screwed together with the second pulling rod.

It should be noted that rear connecting rod 370 is rigidly connected in this embodiment to main body 310. As a result, there is no compression of the new pipe (160) between the tool (130) and the collar (150) at the end of the second pulling rod (140.) That is, the new pipe is pushed into the hole behind the tool, but it is not pushed into the tool to force the tool through the old pipe. It is typical of prior art systems to provide a chain which extends through a pipe-bursting cone to the back end of the new pipe, and then pull the chain, forcing the new pipe to push the cone through the old pipe.

Figure 5:
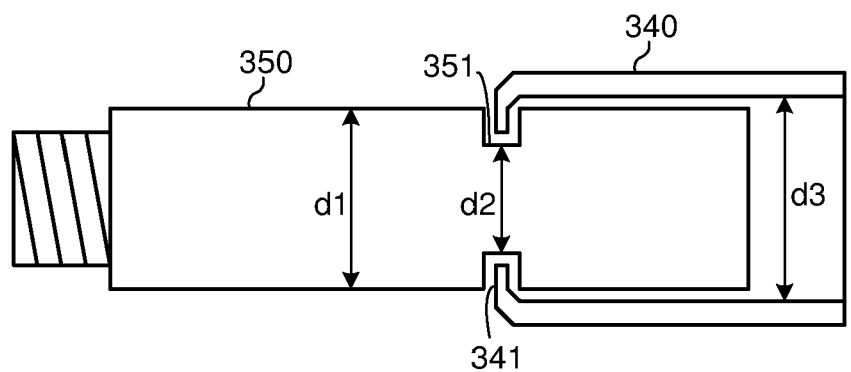
FIG. 5 is a diagram illustrating the swivel mechanism of the nose portion of the pipe-bursting tool of FIG. 1.

Referring to FIG. 5, a diagram illustrating the swivel mechanism of the nose portion of the pipe-bursting tool is shown. In this embodiment, connecting rod 350 has a diameter d1 along most of its length. Near the center of the connecting rod is a waist portion 351 at which the diameter is reduced to d2. Cylinder 340 has an inner diameter d3 which is large enough to accommodate connecting rod 350 (i.e., d3>d1.) At the front end of cylinder 340 is a lip 341 which extends radially inward from the end of the cylinder so that it fits within the gap at waist portion 351 of connecting rod 350. Lip 341 prevents connecting rod 350 from being pulled out of cylinder 340 and therefore allows the tool (the main body of which is connected to cylinder 340) to be pulled by connecting rod 350 (which is coupled to the pulling rod.) The fit of lip 341 within the gap at waist 351, however, is loose enough that connecting rod 350 can move somewhat with respect to cylinder 340. In one embodiment, this mechanism allows the rod and cylinder to be misaligned by up to about 3 degrees. By allowing this misalignment, the mechanism can prevent a substantial amount of stress on the connection between the pulling rod and the tool which is very likely to cause the connection to fail. This is a very important feature of this embodiment because, if the connection fails when the tool is part-way through the old pipe, it is typically necessary to excavate the old pipe in order to remove the tool.

Figure 6:
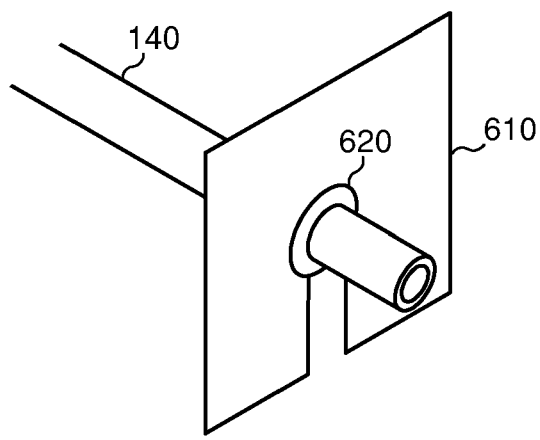
FIG. 6 is a diagram illustrating one embodiment of a collar that can be used at the end of the second pulling rod of FIG. 1.

Referring to FIG. 6, a diagram illustrating one embodiment of a collar that can be used at the end of the second pulling rod is shown. In this embodiment, the collar consists of a simple plate 610 that can be placed over the end of pulling rod 140. The size of the plate is such that it is large enough to contact the new pipe (160) and push the new pipe into the hole behind the pipe-bursting tool, but small enough that it fits within the hole created by the tool. Plate 610 is held in place by a locking collar 620 which prevents the plate from sliding along the length of the pulling rod. In this case, the plate has a slot which allows it to be placed on the ride without having to remove locking collar 620. Many different, alternative structures can be used in place of the plate and locking collar arrangement of FIG. 6 in other embodiments. It should be noted that, while this structure pushes the new pipe into the hole behind the pipe-bursting tool, it only pushes the pipe, and does not push the tool. This reduces the stresses on the new pipe and reduces the likelihood that the new pipe will be damaged when it is pushed into the hole.

It should be noted that there may be many alternative embodiments that vary with respect to the exemplary embodiments described above. For example, while the embodiments above include fins along the sides of the pipe-bursting body, alternative embodiments may have no fins, or they may have different structures on the sides of the body to aid bursting of the old pipe. It should also be noted that the terms used herein should be construed broadly. For instance, the term "pipe" should be construed to include clay pipes, iron pipes, and any other types of pipe, tubing or other conduits that may be burst.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A pipe bursting and replacement tool comprising:
a body having a shape that tapers from a smaller diameter at a front end to a larger diameter at a rear end;
a first plurality of fins that are positioned on a plurality of sides of the body and extend along a direction from the front end of the body to the rear end of the body and extend radially outward from the body to a diameter sufficient to burst a pipe;
a first connector configured to couple a pulling rod to the body and configured to enable misalignment between the body and the rod;
a second plurality of fins positioned at the front end of the body and configured to couple the first connector to the body;
a threaded second connector;
a threaded second rod attached to the second connector; and
a coupling attached to a rear end of the second rod, wherein the coupling is configured to be positioned behind a replacement pipe, thereby coupling the replacement pipe to the body, whereby the replacement pipe is pulled behind the body into a volume previously occupied by an old pipe.

2. The tool of claim 1, wherein the first connector is configured to swivel with respect to the body.

3. The tool of claim 1, wherein the first connector is threaded for attachment to the pulling rod.

4. The tool of claim 1, further comprising a bell-shaped portion at the rear end of the body, wherein the bell-shaped portion has a diameter that increases toward a rear end of the bell-shaped portion.

5. The tool of claim 4, wherein the bell-shaped portion is configured to accommodate a front end of the replacement pipe in a rear-facing cavity of the bell-shaped portion.

6. The tool of claim 1, wherein the second connector is disposed at the rear end of the body.

7. A system comprising:
a rod puller;
a pulling rod;
a pipe-bursting body having a shape that tapers from a smaller diameter at a front end to a larger diameter at a rear end;
a first plurality of fins that are positioned on a plurality of sides of the body and extend along a direction from the front end of the body to the rear end of the body and extend radially outward from the body to a diameter sufficient to burst a pipe;
a first connector configured to couple the pipe-bursting body to the pulling rod and to enable misalignment between the pipe-bursting body and the rod;
a second plurality of fins positioned at the front end of the body and configured to couple the first connector to the body;
a second connector;
a threaded second rod; and
a coupling;
wherein the second connector is disposed at the rear end of the body and is threaded to accept attachment of the second rod, and wherein the coupling is configured to be attached to a rear end of the second rod to maintain the replacement pipe in position behind the body when the body is pulled forward.

8. The system of claim 7, wherein the first connector is configured to swivel with respect to the body.

9. The system of claim 7, wherein the first connector is threaded for attachment to the pulling rod.

10. The system of claim 7, further comprising a bell-shaped portion at the rear end of the pipe-bursting body, wherein the bell-shaped portion has a diameter that increases toward a rear end of the bell-shaped portion, wherein the bell-shaped portion is configured to force remnants of a burst pipe radially outward from the pipe-bursting body and to accommodate a front end of the replacement pipe in a rear-facing cavity of the bell-shaped portion.

11. A method comprising:
providing a pipe-bursting body having a shape that tapers from a smaller diameter at a front end to a larger diameter at a rear end, wherein the pipe-bursting body has a first plurality of fins that are positioned on a plurality of sides of the body and extend along a direction from the front end of the body to the rear end of the body and extend radially outward from the body to a diameter sufficient to burst a pipe, and wherein the pipe-bursting body has a second plurality of fins positioned at the front end of the body and configured to enable misalignment between the pipe-bursting body and a pulling rod coupled to the pipe-bursting body;

pulling the pipe-bursting body through a first pipe using the pulling rod and thereby bursting the first pipe, wherein the pipe-bursting body is allowed to misalign with the pulling rod; and pulling a second rod which is connected to a rear end of the pipe-bursting body, wherein a coupling connected to the second rod is positioned behind a replacement pipe, thereby pulling the replacement pipe behind the pipe-bursting body into a volume previously occupied by the first pipe.

\* \* \* \* \*